US011757779B2

(12) United States Patent
Kimura et al.

(10) Patent No.: US 11,757,779 B2
(45) Date of Patent: Sep. 12, 2023

(54) LOAD DISTRIBUTION SYSTEM AND LOAD DISTRIBUTION METHOD

(71) Applicant: Nippon Telegraph and Telephone Corporation, Tokyo (JP)

(72) Inventors: Akihiro Kimura, Tokyo (JP); Shinya Kawano, Tokyo (JP); Hideo Tsuchiya, Tokyo (JP); Akihiro Okada, Tokyo (JP); Katsuma Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 47 days.

(21) Appl. No.: 17/267,945

(22) PCT Filed: Aug. 9, 2019

(86) PCT No.: PCT/JP2019/031781
§ 371 (c)(1),
(2) Date: Feb. 11, 2021

(87) PCT Pub. No.: WO2020/036162
PCT Pub. Date: Feb. 20, 2020

(65) Prior Publication Data
US 2022/0182325 A1 Jun. 9, 2022

(30) Foreign Application Priority Data
Aug. 13, 2018 (JP) ................................ 2018-152527

(51) Int. Cl.
*H04L 47/125* (2022.01)
*H04L 67/568* (2022.01)

(52) U.S. Cl.
CPC .......... *H04L 47/125* (2013.01); *H04L 67/568* (2022.05)

(58) Field of Classification Search
CPC ...... H04L 47/10–47/125; H04L 67/50–67/568
See application file for complete search history.

(56) References Cited

U.S. PATENT DOCUMENTS 8,295,284 B1 * 10/2012 Singh .................... H04L 45/123
370/392
2004/0228356 A1 * 11/2004 Adamczyk .......... H04L 12/2887
370/401

(Continued)

FOREIGN PATENT DOCUMENTS

| JP | 2004-350078 | 12/2004 |
|----|-------------|---------|
| JP | 2012-186649 | 9/2012 |
| WO | WO 2015/023256 | 2/2015 |

OTHER PUBLICATIONS

Kimura et al., "A Loadbalancing Method of vCPE Server using Flow Characteristics," Proceedings of the 2018 IEICE General Conference, Mar. 20, 2018, p. 90, 3 pages (with English Translation).

*Primary Examiner* — Clayton R Williams
(74) *Attorney, Agent, or Firm* — Fish & Richardson P.C.

(57) ABSTRACT

An application information storage unit configured to store information obtained by associating application information including flow characteristics of an application of a flow constituted by a packet with a flow identifier for identifying the flow of the packet, an acquisition unit configured to acquire, in a case where an input port receives a packet, application information of a flow constituted by the packet from the application information storage unit, and an output unit configured to output the packet received by the input port to a packet transfer apparatus in a load state indicating that a load due to the flow of the flow characteristics is light among a plurality of packet transfer apparatuses according to the flow characteristics included in the application information acquired by the acquisition unit are provided.

14 Claims, 12 Drawing Sheets

(56) References Cited

U.S. PATENT DOCUMENTS

| | | | | |
|---|---|---|---|---|
| 2009/0016358 | A1* | 1/2009 | Lee | H04L 47/122 370/395.53 |
| 2011/0205931 | A1* | 8/2011 | Zhou | H04L 47/10 370/253 |
| 2014/0029617 | A1* | 1/2014 | Wang | H04L 12/54 370/392 |
| 2016/0191348 | A1 | 6/2016 | Lee et al. | |

* cited by examiner

| TRANSMISSION SOURCE IP ADDRESS | TRANSMISSION SOURCE PORT NUMBER | DESTINATION IP ADDRESS | DESTINATION PORT NUMBER | PROTOCOL NUMBER | APPLICATION TYPE | FLOW CHARACTERISTICS |
|---|---|---|---|---|---|---|
| ... | ... | 10.0.0.100 | 443 (HTTPS) | 6(TCP) | MOVING IMAGE | HIGH bps FLOW |
| ... | ... | 20.0.0.1 | 5004 (RTP) | 17(UDP) | MOVING IMAGE | HIGH bps FLOW |
| ... | ... | ... | ... | ... | ... | ... |

Fig. 3

| TRANSMISSION SOURCE IP ADDRESS | TRANSMISSION SOURCE PORT NUMBER | DESTINATION IP ADDRESS | DESTINATION PORT NUMBER | PROTOCOL NUMBER | APPLICATION TYPE | FLOW CHARACTERISTICS | TIMESTAMP |
|---|---|---|---|---|---|---|---|
| — | — | 10.0.0.100 | 443 (HTTPS) | 6(TCP) | MOVING IMAGE | HIGH bps FLOW | 2018.05.31.12:30:00 |
| — | — | 20.0.0.1 | 5004 (RTP) | 17(UDP) | MOVING IMAGE | HIGH bps FLOW | 2018.05.31.16:00:00 |
| ... | ... | ... | ... | ... | ... | ... | ... |

Fig. 4

LOAD DISTRIBUTION SYSTEM AND LOAD DISTRIBUTION METHOD

CROSS-REFERENCE TO RELATED APPLICATIONS

This application is a National Stage application under 35 U.S.C. § 371 of International Application No. PCT/JP2019/031781, having an International Filing Date of Aug. 9, 2019, which claims priority to Japanese Application Serial No. 2018-152527, filed on Aug. 13, 2018. The disclosure of the prior application is considered part of the disclosure of this application, and is incorporated in its entirety into this application.

TECHNICAL FIELD

The present invention relates to a load balancing system and a load balancing method.

BACKGROUND ART

A technology for balancing loads of packet transfer apparatuses such as routers has been known. For example, a technology for balancing loads of packet transfer apparatuses by preparing, as transfer destinations of packets, a plurality of packet transfer apparatuses and a plurality of transfer paths and equally applying traffic to these transfer paths has been known. A technology called equal cost multi path (ECMP) or ECMP routing has been known as such load balancing technologies. The ECMP is a load balancing technology for equally applying the traffic to the transfer paths at equal cost among the plurality of transfer paths.

A technology for monitoring an output buffer of an output physical port of the packet transfer apparatus and switching the transfer paths when the amount of usage of the output buffer or a packet flow exceeds a threshold in the load balancing system using the ECMP has been known (for example, PTL1).

As an index of a transfer capacity in the packet transfer apparatus, there are a transfer capacity for the amount of data expressed by bits per second (bps) and a transfer capacity for the number of packets expressed by packets per second (pps). These transfer capacities have an upper limit unique to the packet transfer apparatus. For example, when the packet transfer apparatus is achieved by a network virtualization technology, bps may be limited by a line rate of a physical network interface card (NIC), and pps may be limited to a packet processing speed of software such as an operating system (OS) or an application.

In the ECMP, flow characteristics, that is, whether a flow is a long packet-centered flow or a short packet-centered flow, is not considered. Accordingly, in a case where there is a deviation in packet length transferred by the packet transfer apparatus, the transfer capacity of the packet transfer apparatus is not available at the maximum. Here, the flow refers to the packets (traffic) or a packet group of which a flow identifier for identifying the flow is the same. The flow identifier is specified by header information included in the packet, and refers to, for example, 5-tuple (transmission source Internet Protocol (IP) address, a destination IP address, a transmission source port number, a destination port number, and a protocol number), or L7 information (for example, header information of L7).

For example, traffic of a moving image or the like has properties having a large number of long packets. Thus, when the traffic of the moving image or the like is concentrated, the transfer capacity for the amount of data is lacked, whereas enough transfer capacity is retained for the number of packets. Meanwhile, for example, traffic of Voice over Internet Protocol (VoIP), telemetering, or the like has properties having a large number of short packets. Thus, when the traffic of the VoIP, the telemetering, or the like is concentrated, enough transfer capacity for the amount of data is retained, whereas the transfer capacity of the number of packets is lacked.

There is a technology for balancing the loads in consideration of the flow characteristics. For example, there is a load balancing method of performing load balancing of a server that hosts a virtualized CPE (vCPE) that virtualizes some functions of customer-premises equipment on the basis of a load state and a packet length of the flow in terms of the bps and the pps of the server (for example, NPL1).

CITATION LIST

Patent Literature

PTL1: JP 2004-350078 A

Non Patent Literature

NPL1: Kimura Akihiro, Miyamoto Katsuma, Kawano Shinya, Tsuchiya Hideo, and Okada Akihiro, "Load balancing method of vCPE Server based on flow characteristics", Proceedings of the 2018 IEICE General Conference, Vol. 2018_Communication (2), p. 90 b-6-90

SUMMARY OF THE INVENTION

Technical Problem

When the load balancing is performed on the basis of the flow characteristics, it is necessary to efficiently and accurately specify the flow characteristics.

An embodiment of the present invention has been made in view of the above points, and an object thereof is to efficiently and accurately specify flow characteristics.

Means for Solving the Problem

To achieve the above object, a load balancing system according to an embodiment of the present invention includes an application information storage unit configured to store information obtained by associating application information including flow characteristics of an application of a flow constituted by a packet with a flow identifier for identifying the flow of the packet, an acquisition unit configured to acquire, in a case where an input port receives a packet, application information of a flow constituted by the packet from the application information storage unit, and an output unit configured to output the packet received by the input port to a packet transfer apparatus in a load state indicating that a load due to the flow of the flow characteristics is light among a plurality of packet transfer apparatuses according to the flow characteristics included in the application information acquired by the acquisition unit.

Effects of the Invention

An object of the disclosure is to efficiently and accurately specify flow characteristics.

BRIEF DESCRIPTION OF DRAWINGS

FIG. 3 is a diagram showing an example of an entry of an application information database according to the example.

FIG. 4 is a diagram showing an example of an entry of an application information cache according to the example.

DESCRIPTION OF EMBODIMENTS

Hereinafter, an embodiment according to the present invention will be described. In the embodiment of the present invention, a load balancing system 1 for specifying flow characteristics and performing load balancing on the basis of the specified flow characteristics will be described. Hereinafter, it is assumed that there are a "high bps flow" indicating a flow of a large number of long packets and a "high pps flow" indicating a flow of a large number of short packets as the flow characteristics.

Overall Configuration

Figure 1:
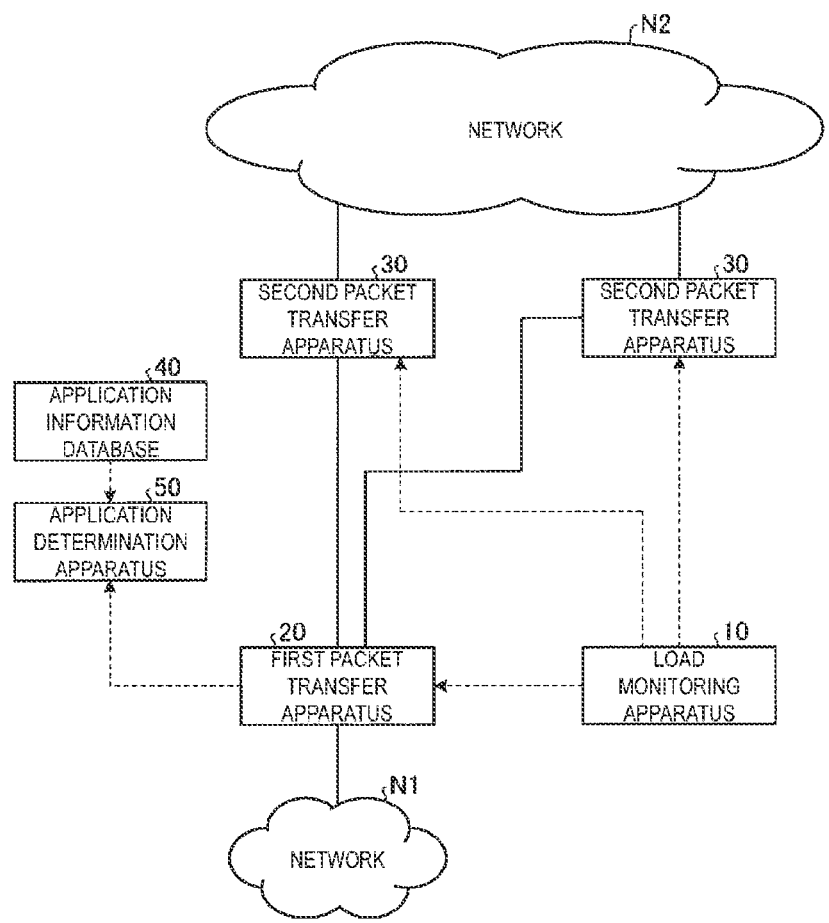
FIG. 1 is a diagram illustrating an example of an overall configuration of a load balancing system according to an embodiment of the present invention.

First, an overall configuration of the load balancing system 1 according to the embodiment of the present invention will be described with reference to FIG. 1. FIG. 1 is a diagram illustrating an example of the overall configuration of the load balancing system 1 according to the embodiment of the present invention.

As illustrated in FIG. 1, the load balancing system 1 according to the embodiment of the present invention includes a load monitoring apparatus 10, a first packet transfer apparatus 20, second packet transfer apparatuses 30, an application information database 40, and an application determination apparatus 50.

The load monitoring apparatus 10 is, for example, a computer or a computer system, and monitors a traffic flow of the second packet transfer apparatus 30 that is a load balancing target. When the traffic flow of the second packet transfer apparatus 30 exceeds a predetermined threshold (or falls below the predetermined threshold), the load monitoring apparatus 10 transmits a command indicating that load balancing is to be implemented (or the load balancing is to be canceled) to the first packet transfer apparatus 20.

The first packet transfer apparatus 20 is, for example, a router, and transfers a packet from a network N1 to the second packet transfer apparatus 30. At this time, the first packet transfer apparatus 20 transfers the corresponding packet to the second packet transfer apparatus 30 corresponding to the flow characteristics among a plurality of second packet transfer apparatuses 30 while referring to a predetermined table used for the load balancing.

The first packet transfer apparatus 20 changes the predetermined table used for the load balancing according to a command from the load monitoring apparatus 10.

The second packet transfer apparatus 30 is, for example, a router, and transfers the packet transferred from the first packet transfer apparatus 20 to a network N2. Hereinafter, when the plurality of second packet transfer apparatuses 30 are distinguished from each other, these packet transfer apparatuses are referred to as a "second packet transfer apparatus 30-1", a "second packet transfer apparatus 30-2", and the like.

The application information database 40 is a database that stores, as application information, an application type and flow characteristics for each flow. Here, the application is an application, the application type is a type of the application, and the flow characteristics are flow characteristics of the application. The application determination apparatus 50 is a computer or a computer system, for example, and searches for the application information of the flow by using the application information database 40.

Note that, the configuration of the load balancing system 1 illustrated in FIG. 1 is an example, and other configurations may be employed. For example, the first packet transfer apparatus 20 and the second packet transfer apparatus 30 may be a virtual router built on a computer by a network virtualization technology.

EXAMPLE

Hereinafter, an example of the load balancing system 1 according to the embodiment of the present invention will be described below.

Functional Configuration

Figure 2:
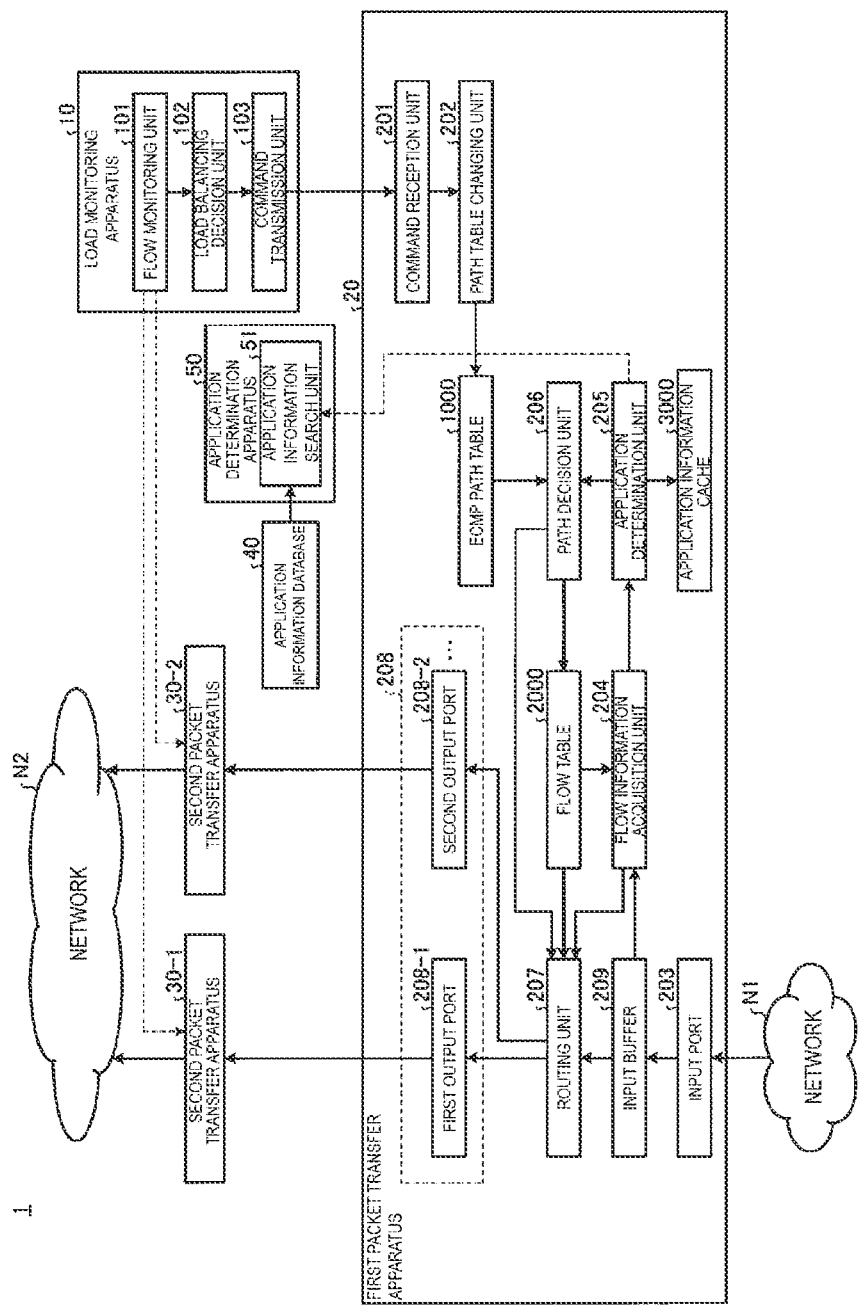
FIG. 2 is a diagram illustrating an example of a functional configuration of the load balancing system according to an example.

First, a functional configuration of the load balancing system 1 according to the example will be described with reference to FIG. 2. FIG. 2 is a diagram illustrating an example of the functional configuration of the load balancing system 1 according to the example.

As illustrated in FIG. 2, the load monitoring apparatus 10 according to the example includes a flow monitoring unit 101, a load balancing decision unit 102, and a command transmission unit 103.

The flow monitoring unit 101 monitors the traffic flows of these second packet transfer apparatuses 30 for the amount of data (bps) and the number of packets (pps) by using the statistical information of the second packet transfer apparatus 30. That is, the flow monitoring unit 101 obtains the amount of data (bps) and the number of packets (pps) as a monitoring result for each second packet transfer apparatus 30. Hereinafter, the obtained amount of data (bps), which is the monitoring result, is referred to as a "bps result value", and the obtained number of packets (pps), which is the monitoring result, is referred to as a "pps result value".

The load balancing decision unit 102 decides whether to implement or cancel the load balancing. That is, the load balancing decision unit 102 determines whether the bps result value exceeds or falls below a preset bps threshold. Similarly, the load balancing decision unit 102 determines whether the pps result value exceeds or falls below a preset pps threshold.

When it is determined that the bps result value exceeds the bps threshold, the load balancing decision unit 102 decides to implement the load balancing. Meanwhile, when it is determined that the bps result value falls below the bps threshold, the load balancing decision unit 102 decides to cancel the load balancing.

Similarly, when it is determined that the pps result value exceeds the pps threshold, the load balancing decision unit 102 decides to implement the load balancing. Meanwhile, when it is determined that the pps result value falls below the pps threshold, the load balancing decision unit 102 decides to cancel the load balancing.

When the load balancing decision unit 102 decides to implement the load balancing, or decides to cancel the load balancing, the command transmission unit 103 transmits a predetermined command to the first packet transfer apparatus 20.

Here, the command includes a "threshold type", a "command type", and "identification information of a target apparatus". The "threshold type" is a type of the threshold that the monitoring result exceeds or a type of the threshold that the monitoring result falls below, and any of information indicating the bps threshold or information indicating the pps threshold is set. Information indicating whether to implement or cancel the load balancing is set to the "command type". The "identification information of the target apparatus" is identification information of the second packet transfer apparatus 30 for which the monitoring result exceeds the threshold or falls below the threshold, and, for example, an IP address of the second packet transfer apparatus 30 is set to the "identification information of the target apparatus". However, for example, an ID of the second packet transfer apparatus 30, a media access control (MAC) address, and a hostname in addition to the IP address may be set to the "identification information of the target apparatus".

The application information database 40 is a database for associating a flow identifier with the application type and the flow characteristics. FIG. 3 is a diagram showing an example of an entry of the application information database 40 according to the example. FIG. 3 shows a case where the flow identifier is 5-tuple. As shown in FIG. 3, the entry of the application information database 40 includes a "transmission source IP address", a "transmission source port number", a "destination IP address", a "destination port number", a "protocol number", an "application type", and "flow characteristics".

An IP address of a transmission source of the packet is set to the "transmission source IP address". A port number of the transmission source of the packet is set to the "transmission source port number". An IP address of a destination of the packet is set to the "destination IP address". A port number of the destination of the packet is set to the "destination port number". A number indicating a type of a protocol is set to the "protocol number". The type of the application of the flow is set to the "application type". For example, the type of the application includes "moving image", "VoIP", and "telemetering". Whether the flow is the "high bps flow" or the "high pps flow" is set to the "flow characteristics".

Note that, the "transmission source IP address" and the "transmission source port number" may not be included in the entry of the application information database 40. For example, in FIG. 3, the "application type" of a flow in which the "destination IP address" is "10.0.0.100", the "destination port number" is "443", and the "protocol number" is "6" is a "moving image", and the "flow characteristics" are the "high bps flow". Here, the "443" for the "destination port number" is a port number used in Hypertext Transfer Protocol Secure (HTTPS), and the "6" of the "protocol number" indicates that the protocol is the Transmission Control Protocol (TCP).

The application information database 40 is realized by, for example, a random access memory (RAM), an auxiliary storage apparatus, a dedicated memory apparatus, or the like.

The application determination apparatus 50 includes an application information search unit 51. The application information search unit 51 receives the flow identifier from the first packet transfer apparatus 20, searches the application information database 40 with the flow identifier as the key, and specifies the application type and the flow characteristics. The application information search unit 51 transmits the specified application type and flow characteristics together with the flow identifier to the first packet transfer apparatus 20.

As illustrated in FIG. 2, the first packet transfer apparatus 20 according to the example includes a command reception unit 201, a path table changing unit 202, an input port 203, a flow information acquisition unit 204, an application determination unit 205, a path decision unit 206, a routing unit 207, output ports 208, and an input buffer 209. Each of these functional units is achieved by processing of causing a CPU or the like to execute one or more programs installed in the first packet transfer apparatus 20.

The command reception unit 201 receives a command from the load monitoring apparatus 10. The path table changing unit 202 changes an ECMP path table 1000 according to the command received by the command reception unit 201. The ECMP path table 1000 is a table storing path information as entries. Note that, the ECMP path table 1000 is stored in, for example, an auxiliary storage apparatus, a dedicated memory apparatus, or the like. Details of the ECMP path table 1000 according to the example are described below.

The input port 203 receives a packet from the network N1. The input port 203 stores the received packet in the input buffer 209. Note that, the input buffer 209 is a storage region for temporarily storing the received packet, and is realized, for example, by a RAM, an auxiliary storage apparatus, a dedicated memory apparatus, or the like.

The flow information acquisition unit 204 generates a hash value from the flow identifier (for example, 5-tuple) of the packet stored in the input buffer 209. The flow information acquisition unit 204 determines whether there is an entry including a hash value matching the generated hash value while referring to a flow table 2000. The flow table 2000 is a table storing flow transfer information in which the hash value and information (output port information) indicating the output port 208 are associated with each other as entries. The output port information is information for specifying any one output port 208 of the plurality of output ports 208. Note that, the flow table 2000 is stored in, for example, a RAM, an auxiliary storage apparatus, a dedicated memory apparatus, or the like.

When it is determined that there is the corresponding entry, the flow information acquisition unit 204 notifies the routing unit 207 of the entry. Meanwhile, when it is determined that there is no corresponding entry, the flow information acquisition unit 204 determines the corresponding packet to be a packet of a new flow, and notifies the application determination unit 205 that there is no corresponding entry. At this time, the flow information acquisition unit 204 notifies the application determination unit 205 of the flow identifier and the hash value.

Note that, the entry (flow transfer information) stored in the flow table 2000 may be deleted (cleared) every predetermined time by, for example, the path decision unit 206 or the like.

According to the notification from the flow information acquisition unit 204, the application determination unit 205 searches an application information cache 3000, and specifies the application type and the flow characteristics corresponding to the flow of the received packet. The application determination unit 205 searches the application information cache 3000 with the flow identifier as the key.

FIG. 4 is a diagram showing an example of an entry of the application information cache 3000 according to the example. As shown in FIG. 4, similarly to the entry of the application information database 40 shown in FIG. 3, the entry of the application information cache 3000 includes a "transmission source IP address", a "transmission source port number", a "destination IP address", a "destination port number", a "protocol number", an "application type", and "flow characteristics".

The entry of the application information cache 3000 includes a "timestamp". Year, month, day, hour, minute, and second at which the entry is registered in the application information cache 3000 are set to the "timestamp".

When the application determination unit 100 searches the application information cache 3000 and cannot specify the application type and the flow characteristics, that is, when an entry corresponding to the flow of the received packet is not stored in the application information cache 3000, the application determination unit 205 requests the specification of the application type and the flow characteristics by transmitting the flow identifier to the application determination apparatus 50.

The application determination unit 205 registers the application type and the flow characteristics acquired from the application determination apparatus 5 in association with the flow identifier in the application information cache 3000. The application information cache 3000 is used by being divided into three areas, and the application determination unit 205 registers the application type and the flow characteristics in one area of the three areas on the basis of the application type.

Figure 5:
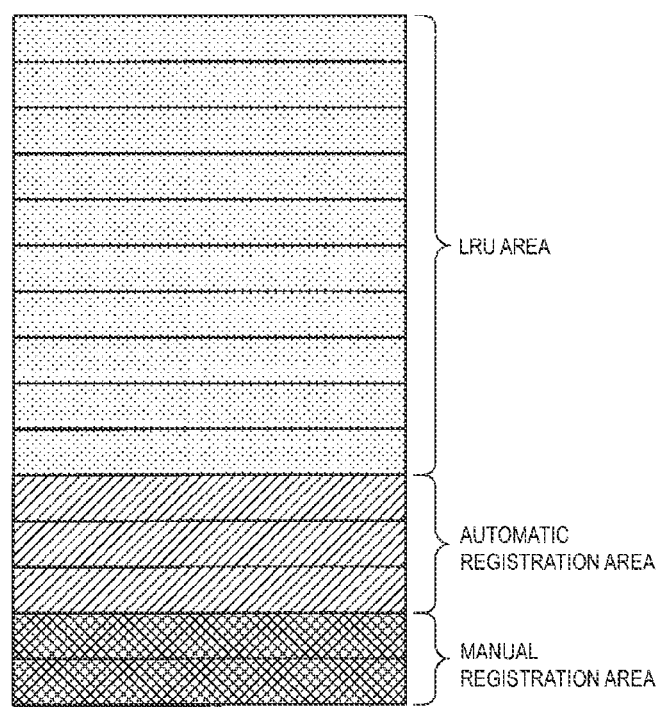
FIG. 5 is a diagram for describing a method of using the application information cache according to the example.

FIG. 5 is a diagram for describing a method of using the application information cache 3000 according to the example. As illustrated in FIG. 5, the application information cache 3000 is divided into a Least Recently Used (LRU) area having a low priority, an automatic registration area having a medium priority, and a manual registration area having a high priority.

Here, the priority indicates order in which the entry is deleted from the application information cache 3000 in a case where the application information cache 3000 is filled and the entry is replaced. The entry having lower priority is preferentially deleted from the application information cache.

Note that although each area is illustrated as a continuous area in FIG. 5, each area is a discontinuous area, and the entry of each area is managed by a list structure or the like.

An entry for a flow of a normal application is registered in the LRU area. When the entry is replaced, the replacement is performed according to an LRU algorithm.

An entry for a flow of an application that needs to be preferentially cached is registered in the automatic registration area. For example, an entry of a flow of an application that needs low delay properties is registered in the automatic registration area. When the entry is replaced, the replacement is performed in the LRU area and the automatic registration area according to the LRU algorithm. However, for the entry into the automatic registration area, a value obtained by multiplying an elapsed time calculated from the "timestamp" by any weighting factor $\omega$ ($0<\omega<1$) is used. When an entry in the automatic registration area is deleted, the deleted entry is replaced with the entry of the LRU area.

The manual registration area is an area in which an entry explicitly registered by a user, an operator, or the like is cached. When the entry is replaced, the replacement is performed in the LRU area and the automatic registration area according to the LRU algorithm. However, for the entry in the automatic registration area, a value obtained by multiplying the elapsed time by any weighting factor $\omega$ ($0<\omega<1$) is used. When all the areas of the application information cache 3000 are the manual registration areas, notification of an error is transmitted by the application determination unit 205. When an entry in the manual registration area is deleted, the deleted entry is replaced with the entry in the LRU area.

The application determination unit 205 notifies the path decision unit 206 of the specified application type and flow characteristics. At this time, the application determination unit 205 notifies the path decision unit 206 of the 5-tuple, the application type, the flow characteristics, and the hash value.

Note that, the "flow characteristics" may be excluded from the entries of the application information database 40 and the application information cache 3000, and the application information search unit 51 and the application determination unit 205 may search the application information database 40 and the application information cache 3000 for the application type. In this case, the application determination unit 205 specifies the flow characteristics from the application type on the basis of a correspondence relationship between the application type and the flow characteristics.

Referring back to FIG. 2, the path decision unit 206 decides the output port 208 from the flow characteristics specified by the application determination unit 205 while referring to the ECMP path table 1000. The path decision unit 206 stores flow transfer information in which information indicating the decided output port 208 and the hash value are associated with each other in the flow table 2000. The path decision unit 206 notifies the routing unit 207 of the entry (flow transfer information) stored in the flow table 2000.

The routing unit 207 acquires the output port information included in the entry (flow transfer information) notified by the flow information acquisition unit 204 or the path decision unit 206. The routing unit 207 transmits the corresponding packet to the output port 208 indicated by the acquired output port information.

The output port 208 outputs the packet received from the routing unit 207. Here, the output port 208 is present, for example, for each second packet transfer apparatus 30. For example, the output port 208 includes an output port 208-1 corresponding to the second packet transfer apparatus 30-1 and an output port 208-2 corresponding to the second packet transfer apparatus 30-2. Note that, the output port 208 may be a physical port, or may be a logical port.

Figure 6:
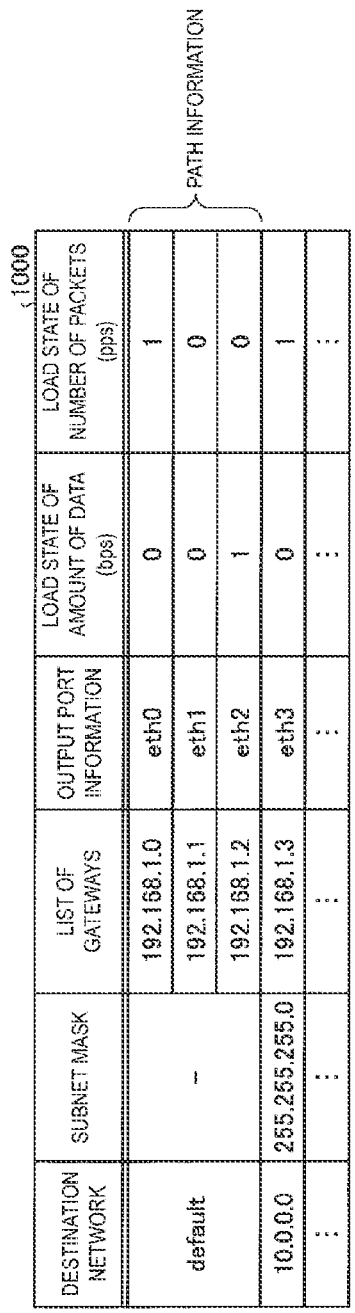
FIG. 6 is a diagram showing an example of an ECMP path table according to the example.

Here, the ECMP path table 1000 according to the example will be described with reference to FIG. 6. FIG. 6 is a diagram showing an example of the ECMP path table 1000 according to the example.

As shown in FIG. 6, the path information is stored as the entry in the ECMP path table 1000 according to the example. The path information includes a "destination network", a "subnet mask", a "list of gateways", "output port information", a "load state of the amount of data (bps)", and a "load state of the number of packets (pps)".

An IP address of the network which is a transfer destination of the packet or default is set to the "destination network". A subnet mask corresponding to the destination network is set to the "subnet mask".

An IP address of the gateway (second packet transfer apparatus 30) corresponding to the destination network is set to the "list of gateways". Note that, IP addresses of one or more gateways for one destination network are set to the "list of gateways".

Information indicating the output port 208 for (the IP address of) each gateway set to the "list of gateways" is set to the "output port information".

In the example shown in FIG. 6, "eth0" indicating the output port 208-1 is associated with a gateway "192.168.1.0". This indicates that the packet is transmitted from the output port 208-1 when the packet is transmitted from the gateway "192.168.1.0".

Similarly, for example, "eth1" indicating the output port 208-2 is associated with a gateway "192.168.1.1". This indicates that the packet is transmitted from the output port 208-2 when the packet is transmitted from the gateway "192.168.1.1". The same applies to other gateways.

For (the IP address of) each gateway set to the "list of gateways", a load state of the amount of data (bps) in the corresponding gateway is set to the "load state of the amount of data (bps)". Here, in the example shown in FIG. 6, when "0" is set to the "load state of the amount of data (bps)", the load state of the amount of data (bps) in the corresponding gateway is a "low load". Meanwhile, when "1" is set to the "load state of the amount of data (bps)", the load state of the amount of data (bps) in the corresponding gateway is a "high load".

For (the IP address of) each gateway set to the "list of gateways", a load state of the number of packets (pps) in the gateway is set to the "load state of the number of packets (pps)". Here, in the example shown in FIG. 6, when "0" is set to the "load state of the number of packets (pps)", the load state of the number of packets (pps) in the corresponding gateway is a "low load". Meanwhile, when "1" is set to the "load state of the number of packets (pps)", the load state of the number of packets (pps) in the corresponding gateway is a "high load".

As stated above, path information including one or more gateways for the corresponding destination network; and the output port information and the load state for each gateway are stored in the ECMP path table 1000 according to the example for each destination network.

As will be described below, in the example, the load balancing is performed such that, in a case where the load state of each gateway (the second packet transfer apparatus 30) exceeds (or falls below) a threshold, the load state corresponding to the gateway is changed, and when the packet is transferred, the packet is transmitted from the gateway in the low load state according to the flow characteristics.

Processing of Balancing System

Figure 7:
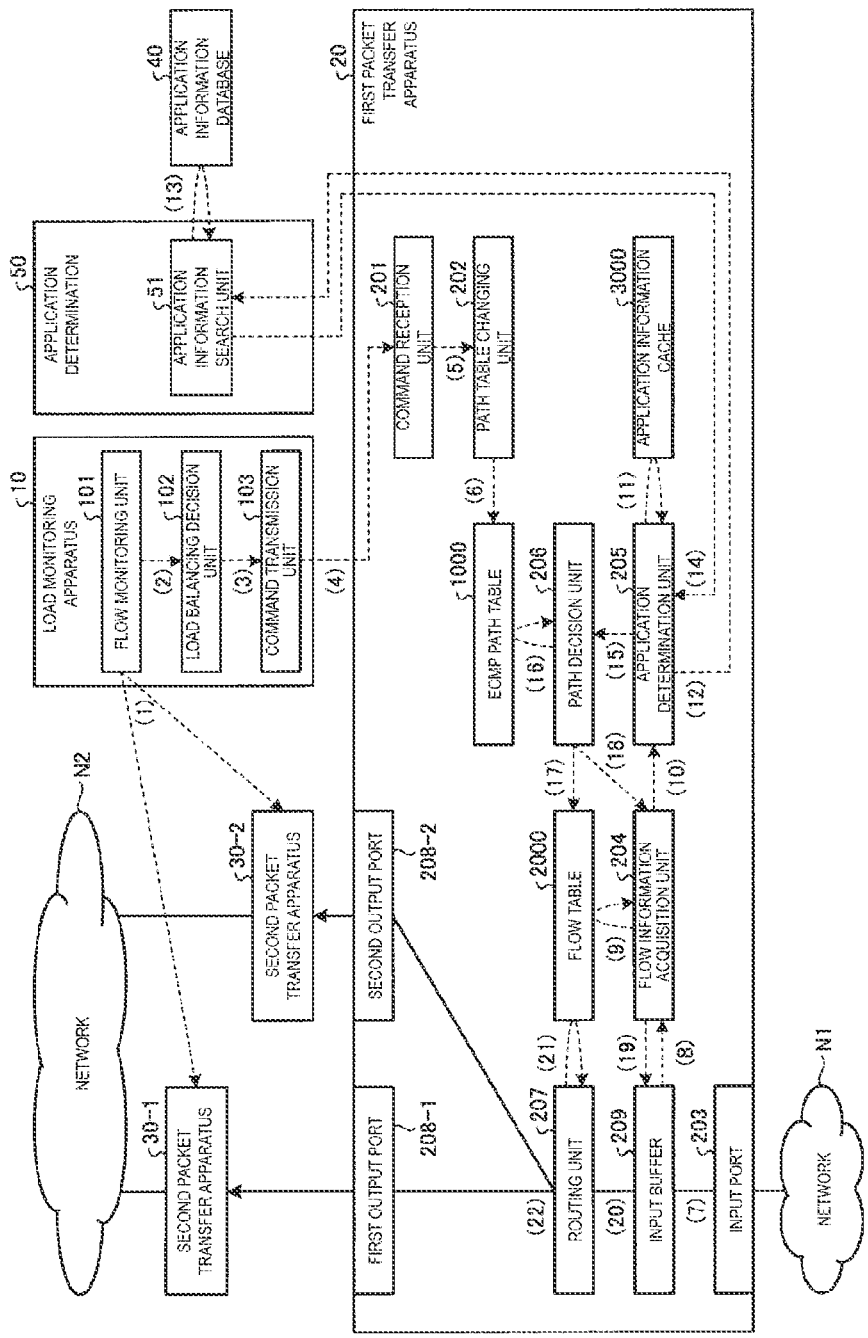
FIG. 7 is a diagram illustrating an example of a flow of processing of the load balancing system according to the example.

Hereinafter, processing of the load balancing system 1 according to the example will be described with reference to FIG. 7. FIG. 7 is a diagram illustrating an example of a flow of the processing of the load balancing system 1 according to the example.

First, the flow monitoring unit 101 of the load monitoring apparatus 10 monitors the traffic flows for the bps and the pps by using the statistical information of the second packet transfer apparatuses 30-1 and 30-2 that are load balancing targets. The flow monitoring unit 101 notifies the load balancing decision unit 102 of the monitoring result (2).

Subsequently, when the monitoring result of the flow monitoring unit 101 exceeds a predetermined bps threshold or a predetermined pps threshold, the load balancing decision unit 102 decides to implement the load balancing. Conversely, when the monitoring result falls below the threshold, the load balancing decision unit 102 decides to cancel the load balancing. The load balancing decision unit 102 notifies the command transmission unit 103 of a decided content (3).

Subsequently, the command transmission unit 103 transmits the command to the first packet transfer apparatus 20 on the basis of the decision of the load balancing decision unit 102 (4). The command includes (i) a threshold type (bps threshold or pps threshold), (ii) a command type (implementation or cancellation), and (iii) identification information on the target apparatus. The identification information on the target apparatus is, for example, an ID, an IP address, a MAC address, and a hostname of the apparatus.

Subsequently, the command reception unit 201 of the first packet transfer apparatus 20 receives a command from the load monitoring apparatus 10, and notifies the path table changing unit 202 of the contents ((i) threshold type, (ii) command type, and (iii) identification information of the target apparatus) of the received command (5).

Subsequently, the path table changing unit 202 changes the contents of the ECMP path table 1000 on the basis of the command (6). The ECMP path table 1000 retains, as the entry, the path information. The entry includes the destination network, the subnet mask, the list of gateways, the output port 208 corresponding to the gateway, and load state information of the gateway.

Subsequently, the input port 203 stores the received packet in the input buffer 209 (7).

Subsequently, the input buffer 209 temporarily buffers the packet and inquires a registration status for the flow table 2000 of the flow information acquisition unit 204 with the 5-tuple of the packet as the flow identifier (8).

Subsequently, the flow information acquisition unit 204 generates the hash value from the flow identifier, and confirms the registration status of the flow identified by the flow identifier while referring to the flow table 2000 with the hash value as the key (9). When the flow is registered in the flow table 2000, the load balancing system 1 omits the following procedure of (10) to (18).

When the flow is not registered in the flow table 2000, the flow information acquisition unit 204 notifies the application determination unit 205 of the flow identifier and the hash value, and waits for a registration notification (18) for the flow table 2000 (10).

Subsequently, the application determination unit 205 conforms a cache status of the flow identified by the flow identifier while referring to the application information cache 3000 with the flow identifier as the key (11). When the flow is cached, the load balancing system 1 omits the following procedure of (12) to (14).

When the flow is not cached, the application determination unit 205 notifies the application information search unit 51 of the application determination apparatus 50 of the flow identifier (12).

Subsequently, the application information search unit 51 refers to the application information database 40 with the flow identifier as the key (13).

The application information search unit 51 notifies the application determination unit 205 of a reference result obtained by referring to the application information database

40 (14). At this time, when there is a matching entry, the application information search unit 51 notifies the application determination unit 205 of the flow identifier, the application type, and the flow characteristics. When there is no matching entry, the application information search unit 51 notifies that there is no matching entry.

Subsequently, the application determination unit 205 notifies the path decision unit 206 of the flow identifier, the application type, the flow characteristics, and the hash value (15). The application determination unit 205 registers the flow identifier, the application type, and the flow characteristics in association with each other in the application information cache 3000.

Subsequently, the path decision unit 206 checks the notification content from the application determination unit 205 against the ECMP path table 1000, and decides the output port 208 (16).

The path decision unit 206 registers the decided output port information in the flow table 2000 (17).

The path decision unit 206 notifies the flow information acquisition unit 204 of completion of the registration for the flow table 2000 (18).

Subsequently, the flow information acquisition unit 204 notifies the input buffer 209 of the registration status for the flow table 2000 (19).

Subsequently, when a notification of the registration status for the flow table 2000 is received from the flow information acquisition unit 204 or a predetermined time elapses, the input buffer 209 transmits the packet to the routing unit 207 (20).

Subsequently, the routing unit 207 refers to the flow table 200 with the 5-tuple of the packet as the key. When there is the flow entry, the routing unit 207 decides the output port 208 according to the flow entry. When the flow entry is unregistered, the routing unit 207 decides the output port 208 by round-robin, and adds the flow entry to the flow table 2000 (21).

The routing unit 207 transfers the packet to the decided output port 208 (22).

Change Processing of ECMP Path Table

Figure 8:
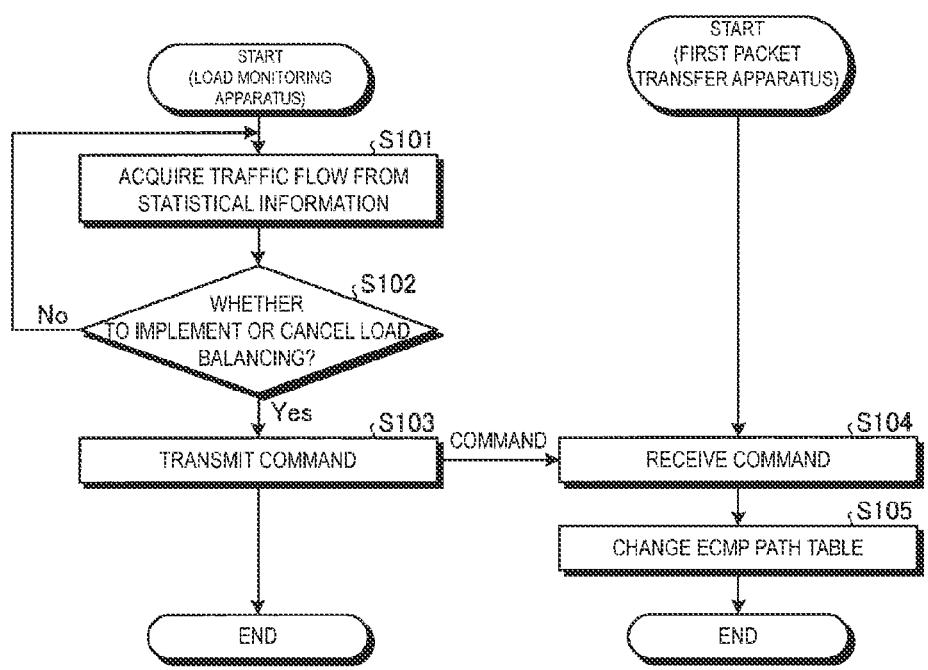
FIG. 8 is a diagram for describing an example of a flow of change processing of the ECMP path table according to the example.

Hereinafter, change processing of the ECMP path table 1000 according to the example will be described with reference to FIG. 8. FIG. 8 is a diagram for describing an example of a flow of the change processing of the ECMP path table 1000 according to the example.

First, the flow monitoring unit 101 of the load monitoring apparatus 10 acquires the bps result value and the pps result value of the second packet transfer apparatus 30 from the statistical information of the second packet transfer apparatus 30 (step S101). Here, the flow monitoring unit 101 acquires the bps result value and the pps result value of each second packet transfer apparatus 30 every predetermined time, for example. Note that, the statistical information can be acquired by, for example, netstat or the like.

Subsequently, the load balancing decision unit 102 of the load monitoring apparatus 10 decides whether to implement or cancel the load balancing (step S102). That is, the load balancing decision unit 102 determines whether the bps result value exceeds or falls below the bps threshold. Similarly, the load balancing decision unit 102 determines whether the pps result value exceeds or falls below the pps threshold. Note that, as the bbs threshold and the pps threshold, the identical value may be decided for all the second packet transfer apparatuses 30 or a value may be decided for each of the second packet transfer apparatuses 30. Alternatively, for example, a value may be decided for each group by grouping one or more second packet transfer apparatuses 30 on a predetermined basis.

When it is determined that the bps result value exceeds the bps threshold, the load balancing decision unit 102 decides to implement the load balancing. Meanwhile, when it is determined that the bps result value falls below the bps threshold, the load balancing decision unit 102 decides to cancel the load balancing.

Similarly, when it is determined that the pps result value exceeds the pps threshold, the load balancing decision unit 102 decides to implement the load balancing. Meanwhile, when it is determined that the pps result value falls below the pps threshold, the load balancing decision unit 102 decides to cancel the load balancing.

When none of the implementation of the load balancing and the cancellation of the load balancing is decided in step S102, a step in the load monitoring apparatus 10 returns to step S101 described above.

Meanwhile, when at least one of the implementation of the load balancing or the cancellation of the load balancing is decided in step S102, the command transmission unit 103 of the load monitoring apparatus 10 transmits a predetermined command to the first packet transfer apparatus 20 (step S103).

The command reception unit 201 of the first packet transfer apparatus 20 receives the command from the load monitoring apparatus 10 (step S104).

Subsequently, the path table changing unit 202 of the first packet transfer apparatus 20 changes the ECMP path table 1000 according to the command received by the command reception unit 201 (step S105).

Specifically, for example, when a notification indicating that the "bps threshold" is set to the "threshold type", the "implementation of the load balancing" is set to the "command type", and "192.168.1.0" is set to the "identification information of the target apparatus" is received, the path table changing unit 202 changes the "load state of the amount of data (bps)" to "1" for the gateway of which the IP address is "192.168.1.0" for each entry of the ECMP path table 1000.

Similarly, for example, when a notification indicating that the "bps threshold" is set to the "threshold type", the "cancellation of the load balancing" is set to the "command type", and "192.168.1.2" is set to the "identification information of the target apparatus" is received, the path table changing unit 202 changes the "load state of the amount of data (bps)" to "0" for the gateway of which the IP address is "192.168.1.2" for each entry of the ECMP path table 1000.

Similarly, for example, when a notification indicating that the "pps threshold" is set to the "threshold type", the "implementation of the load balancing" is set to the "command type", and "192.168.1.1" is set to the "identification information of the target apparatus" is received, the path table changing unit 202 changes the "load state of the number of packets (pps)" to "I" for the gateway of which the IP address is "192.168.1.1" for each entry of the ECMP path table 1000.

Similarly, for example, when a notification indicating that the "pps threshold" is set to the "threshold type", "the cancellation of the load balancing" is set to the "command type", and "192.168.1.0" is set to the "identification information of the target apparatus" is received, the path table changing unit 202 changes the "load state of the number of packets (pps)" to "0" for the gateway of which the IP address is "192.168.1.0" for each entry of the ECMP path table 1000.

As described above, when the bps result value or the pps result value of the second packet transfer apparatus 30 that is the load balancing target exceeds or falls below the threshold, the load balancing system 1 according to the example changes the load state of the second packet transfer apparatus 30 in each entry stored in the ECMP path table 1000. Thus, the load state (the load state of the amount of data (bps) and the load state of the number of packets (pps)) of each second packet transfer apparatus 30 is managed by each entry stored in the ECMP path table 1000.

Packet Transfer Processing

Figure 9:
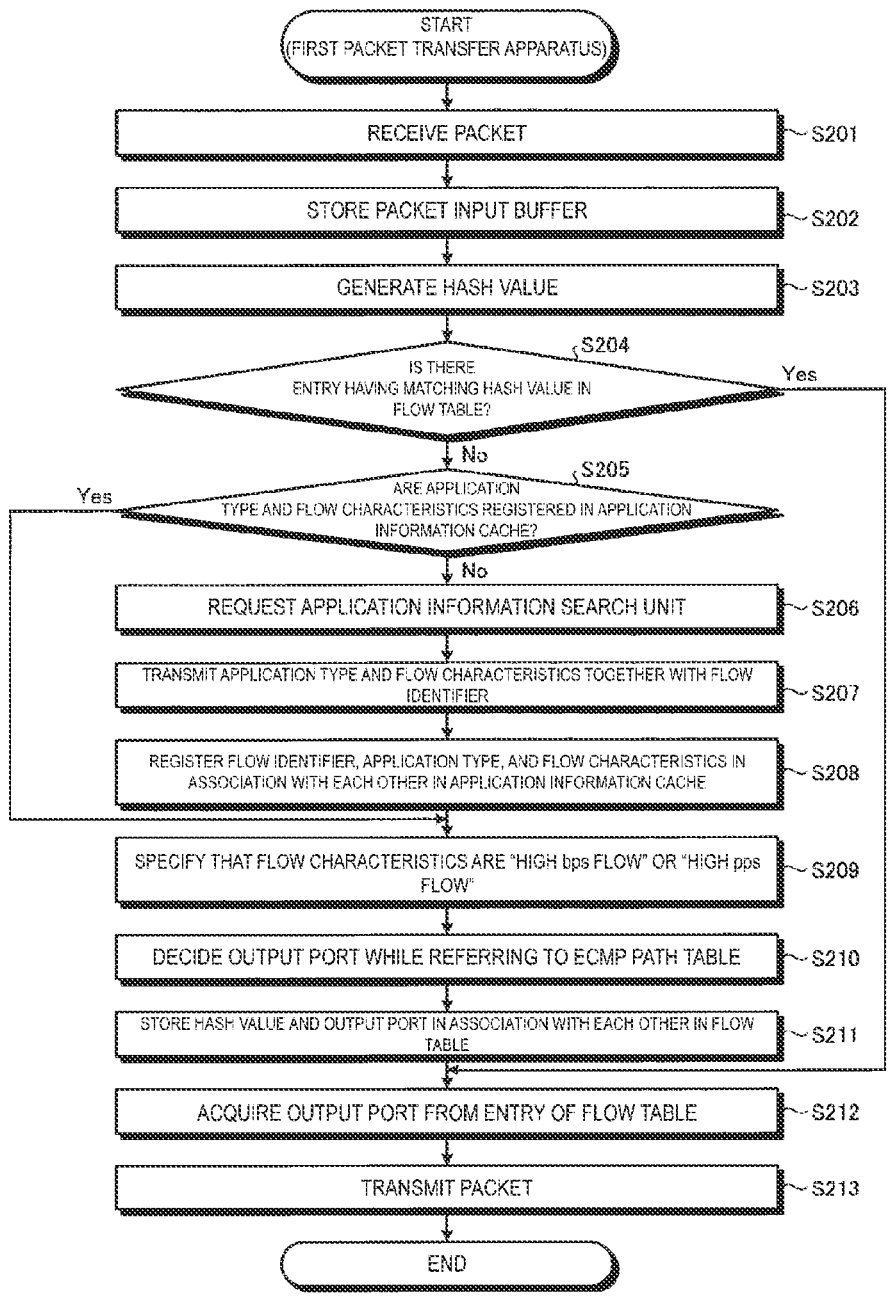
FIG. 9 is a diagram for describing an example of a flow of packet transfer processing according to the example.

Hereinafter, packet transfer processing according to the example will be described with reference to FIG. 9. FIG. 9 is a diagram for describing an example of a flow of the packet transfer processing according to the example.

First, the input port 203 of the first packet transfer apparatus 20 receives the packet from the network N1 (step S201).

Subsequently, the input port 203 stores the packet received in step S201 described above in the input buffer 209 (step S202).

Subsequently, the flow information acquisition unit 204 of the first packet transfer apparatus 20 generates the hash value from the flow identifier (for example, 5-tuple) of the packet stored in the input buffer 209 (step S203). Note that, any hash function can be used to generate the hash value.

Subsequently, the flow information acquisition unit 204 determines whether the entry (flow transfer information) including a hash value matching the hash value generated in step S203 described above is stored in the flow table 2000 (step S204).

When it is determined that the corresponding entry is stored in the flow table 2000 in step S204, processing in the first packet transfer apparatus 20 proceeds to processing of step S212 to be described below.

Meanwhile, when it is determined that the corresponding entry is not stored in the flow table 2000 in step S204, the flow information acquisition unit 204 notifies the application determination unit 205 of the first packet transfer apparatus 20 of the flow identifier and the hash value. The application determination unit 205 determines whether the application type and the flow characteristics of the flow identified by the flow identifier are registered in the application information cache 3000 (step S205).

When it is determined that the application type and the flow characteristics of the flow identified by the flow identifier are registered in the application information cache 3000 in step S205, processing in the first packet transfer apparatus 20 proceeds to processing of step S209 to be described later.

Meanwhile, when it is determined that the application type and the flow characteristics of the flow identified by the flow identifier are not registered in the application information cache 3000 in step S205, the application determination unit 205 requests the application information search unit 51 of the application determination apparatus 50 to specify the application type and the flow characteristics (step S206).

Next, the application information search unit 51 searches the application information database 40 with the flow identifier as the key and transmits the founded application type and flow characteristic along with the flow identifier to the application determination unit 205 (step S207).

Subsequently, the application determination unit 205 registers the flow identifier, the application type, and the flow characteristics in association with each other in the application information cache 3000 (step S208).

The application determination unit 205 notifies the path decision unit 206 of the first packet transfer apparatus 20 of the flow identifier, the application type, the flow characteristics, and the hash value. As a result, the path decision unit 206 specifies whether the flow characteristics of the flow identified by the flow identifier are the "high bps flow" or the "high pps flow" (step S209).

Subsequently, the path decision unit 206 decides the output port 208 from the flow characteristics specified in step S209 described above while referring to the ECMP path table 1000 (step S210). The path decision unit 206 decides the output port 208 by, for example, the following procedure of S1 to S3.

S1) First, the path decision unit 206 searches the ECMP path table 1000 for the entry corresponding to a network address of the destination IP address included in the flow identifier notified from the application determination unit 205. At this time, the path decision unit 206 searches for the entry by longest matching, for example. In a case where the entry corresponding to the corresponding network address is founded, the path decision unit 206 refers to this entry. Meanwhile, when the entry corresponding to the corresponding network address is not founded, the path decision unit 206 refers to an entry in which "default" is set to the destination network.

S2) Subsequently, the path decision unit 206 searches for the gateway in the low load state from among the "list of gateways" included in the referred entry according to the flow characteristics.

For example, when the flow characteristics specified in step S209 described above is the "high bps flow", the path decision unit 206 searches for the gateway in which "0" is set to the "load state of the amount of data (bps)" among the "list of gateways" included in the corresponding entry from the top of the list.

Meanwhile, for example, when the flow characteristics specified in step S209 described above is the "high pps flow", the path decision unit 206 sequentially searches for the gateways in which "0" is set to the "load state of the number of packets (pps)" among the "list of gateways" included in the corresponding entry from the top of the list.

S3) The path decision unit 206 decides that the output port 208 indicated by the output port information corresponding to the gateway founded in S2 described above is the output port 208 of the corresponding packet.

Note that, when the gateway is not founded in S2 described above, the path decision unit 206 decides that the output port 208 indicated by the output port information corresponding to the gateway in the high load state is the output port 208 of the corresponding packet. For example, when there is no gateway in which the flow characteristics specified in step S209 described above are the "high bps flow" and "0" is set to the "load state of the amount of data (bps)", the path decision unit 206 decides that the output port 208 indicated by the output port information corresponding to the gateway in which "1" is set to the "load state of the amount of data (bps)" is the output port 208 of the corresponding packet. Similarly, for example, when the flow characteristics specified in step S209 described above are the "high pps flow" and there is no gateway in which "0" is set to the "load state of the number of packets (pps)", the path decision unit 20 decides that the output port 208 indicated by the output port information corresponding to the gateway in which "1" is set to the "load state of the number of packets (pps)" is the output port 208 of the corresponding packet.

Here, when the output port 208 for the identical destination network is requested to be changed by round-robin, the path decision unit 206 may move information on the gateway corresponding to the decided output port 208 to the end of the "list of gateways". For example, in the ECMP path table 1000 shown in FIG. 6, when the output port information "eth0" of the gateway "192.168.1.0" of the destination network "default" is decided to the output port 208, this gateway "192.168.1.0" may be moved to the end (that is, after the gateway "192.168.1.2") of the list. Accordingly, further load balancing can be expected by changing the output port 208 for the identical destination network by the round-robin method.

Subsequently, the path decision unit 206 stores the flow transfer information in which the hash value notified from the application determination unit 205 and the information (output port information) indicating the output port 208 decided in step S210 described above are associated with each other in the flow table 2000 (step S211).

Subsequently, the routing unit 207 of the first packet transfer apparatus 20 acquires the output port information from the corresponding entry (the entry for which it is determined that the hash values match in step S204 described above or the entry stored in step S211 described above) (step S212). The routing unit 207 transmits the corresponding packet to the output port 208 indicated by the acquired output port information.

Subsequently, the output port 208 of the first packet transfer apparatus 20 transmits the packet received from the routing unit 207 (step S213).

As described above, the application determination unit 205 specifies the flow characteristics of the flow identified by the flow identifier while referring to the application information cache 3000. Thus, the application determination unit 205 can efficiently specify the flow characteristics. When information on the flow identified by the flow identifier is not registered in the application information cache 3000, the application determination unit 205 specifies the flow characteristics on the basis of the application information database 40. Thus, the application determination unit 205 can accurately specify the flow characteristics.

Figure 10:
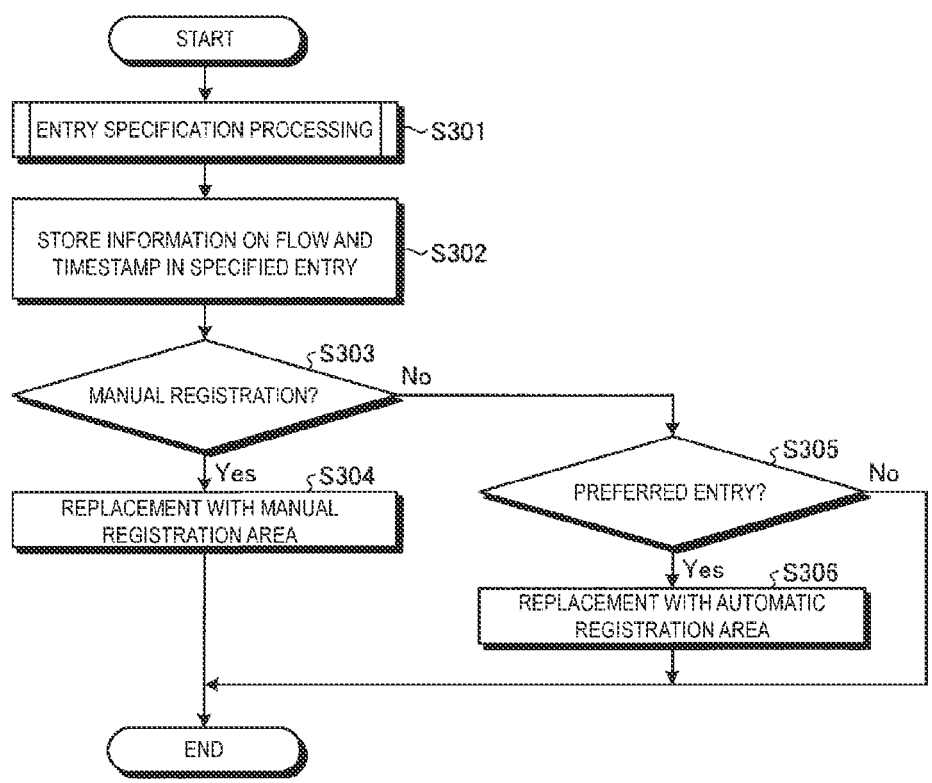
FIG. 10 is a diagram for describing an example of a flow of registration processing for the application information cache according to the example.

Registration Processing for Application Information Cache Hereinafter, registration processing for the application information cache 3000 according to the example will be described with reference to FIG. 10. FIG. 10 is a diagram for describing an example of a flow of the registration processing for the application information cache 3000 according to the example.

First, the application determination unit 205 of the first packet transfer apparatus 20 performs entry specification processing of specifying the entry for registering the information on the flow in the application information cache 3000 (step S301). The application determination unit 205 stores the information on the flow and the timestamp in the specified entry (step S302).

The application determination unit 205 determines whether the registration is manual registration (step S303). Here, "a case where the registration is the manual registration" means a case where the registration for the application information cache 3000 is performed by a user or an operator.

When it is determined that the registration is the manual registration in step S303, the application determination unit 205 replaces the area of the registered entry with the manual registration area (step S304).

Meanwhile, when it is determined that the registration is not the manual registration in step S303, the application determination unit 205 determines whether the registered entry is a preferred entry (step S305). Here, the preferred entry means an entry that is to be registered in the automatic registration area.

When it is determined that the registered entry is the preferred entry in step S305, the application determination unit 205 replaces the area of the registered entry with the automatic registration area (step S306).

Note that, since the area of the entry specified in the entry specification processing is the LRU area, when it is determined that the registered entry is not the preferred entry in step S305, the area of the registered entry needs not be replaced.

Figure 11:
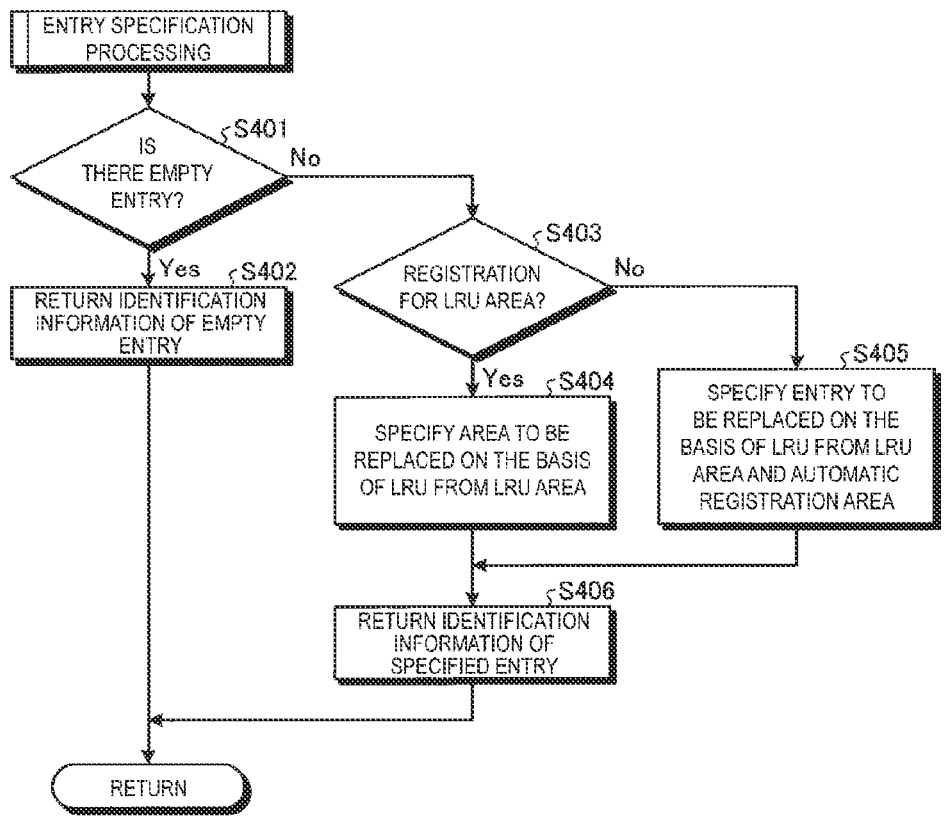
FIG. 11 is a diagram for describing an example of a flow of entry specification processing.

FIG. 11 is a diagram for describing an example of a flow of the entry specification processing. As illustrated in FIG. 11, the application determination unit 205 determines whether there is an empty entry in the application information cache 3000 (step S401).

When it is determined that there is the empty entry in step S401, the application determination unit 205 returns the identification information of the empty entry (step S402).

Meanwhile, when it is determined that there is no empty entry in step S401, the application determination unit 205 determines whether the registration is performed for the LRU area (step S403).

When it is determined that the registration is performed for the LRU area in step S403, the application determination unit 205 specifies an entry to be replaced among entries in the LRU area on the basis of the LRU (step S404).

Meanwhile, when it is determined that the registration is not performed for the LRU area in step S403, the application determination unit 205 specifies an entry to be replaced among entries in the LRU area and the automatic registration area on the basis of the LRU (step S405). However, for the entry of the automatic registration area, when the entry to be deleted is specified, the application determination unit 205 uses the value obtained by multiplying the elapsed time by any weighting factor ω. When the entry to be deleted is the entry in the automatic registration area, the area of the entry to be deleted is replaced with the LRU area.

The application determination unit 205 returns the identification information of the specified entry (step S406).

As described above, when the packet is transferred from the first packet transfer apparatus 20 to the second packet transfer apparatus 30, the load balancing system 1 according to the example transfers the corresponding packet to the second packet transfer apparatus 30 in the low load state according to the flow characteristics of the flow of the corresponding packet. Accordingly, in the load balancing system 1 according to the example, it is possible to archive the load balancing of the second packet transfer apparatus 30. Thus, for example, in the load balancing system 1, it is possible to prevent a situation in which the packet of the high bps flow is concentrated on a certain second packet transfer apparatus 30 and a situation in which the packet of the high pps flow is concentrated, and it is possible to maximize a transfer capacity of the second packet transfer apparatus 30.

The load balancing system 1 according to the example stores the application information including the flow characteristics of the application in association with the flow identifier in the application information database 40. The application determination apparatus 50 searches the application information database 40 with the flow identifier as the key, acquires the application information, and transmits the acquired application information to the first packet transfer apparatus 20. Thus, the first packet transfer apparatus 20 may accurately specify the flow characteristics.

The load balancing system 1 according to the example caches a part of data stored in the application information database 40 in the application information cache 3000. Thus, the first packet transfer apparatus 20 can efficiently specify the flow characteristics.

In the load balancing system 1 according to the example, the application information cache 3000 is divided into the LRU area, the automatic registration area in which the entry is less likely to be replaced than the LRU area, and the manual registration areas in which the entry is not replaced. The application determination unit 205 registers cache information in the LRU area or the automatic registration area on the basis of the application type included in the application information. This makes it difficult to delete the entry from the application information cache 3000 depending on the type of the application, and the first packet transfer apparatus 20 can more efficiently specify the flow characteristics for a specific application.

In the load balancing system 1 according to the example, when the entry is registered in the automatic registration area and the entry is replaced on the basis of the LRU, the application determination unit 205 specifies the entry to be replaced among entries in the automatic registration area or the LRU area. At this time, the application determination unit 205 specifies the entry to be replaced by using the value obtained by multiplying the elapsed time by ω for the entry in the automatic registration area. Accordingly, the application determination unit 205 can set the entry in the automatic registration area such that the entry is less likely to be deleted than the entry in the LRU area.

Hardware Configuration

Figure 12:
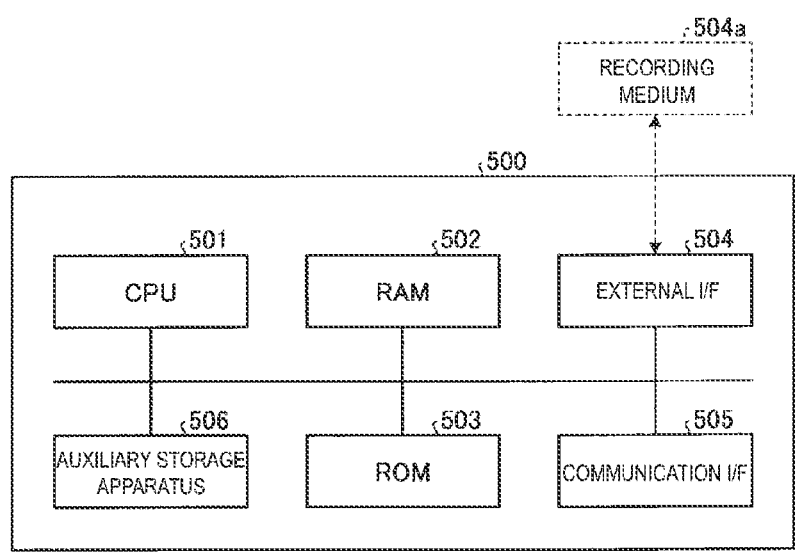
FIG. 12 is a diagram illustrating an example of a hardware configuration of a computer.

Finally, hardware configurations of the load monitoring apparatus 10, the first packet transfer apparatus 20, the second packet transfer apparatus 30, and the application determination apparatus 50 according to the embodiment of the present invention will be described. The load monitoring apparatus 10, the first packet transfer apparatus 20, the second packet transfer apparatus 30, and the application determination apparatus 50 according to the embodiment of the present invention are realized by using, for example, one or more computers 500 illustrated in FIG. 12. FIG. 12 is a diagram illustrating an example of the hardware configuration of the computer 500.

The computer 500 illustrated in FIG. 12 includes a central processing unit (CPU) 501, a RAM 502, a read only memory (ROM) 503, an external I/F 504, a communication I/F 505, and an auxiliary storage apparatus 506. These pieces of hardware are communicably connected to each other via a bus B.

The CPU 501 is an arithmetic apparatus that reads programs and data from the ROM 503, the auxiliary storage apparatus 506, or the like and stores the programs and data in the RAM 502; and executes processing.

The RAM 502 is a volatile semiconductor memory that temporarily stores programs and data. The ROM 503 is a non-volatile semiconductor memory that can retain programs and data even when a power is turned off. For example, an OS configuration, a network configuration, and the like are stored in the ROM 503.

The external I/F 504 is an interface with an external apparatus. The external apparatus includes a recording medium 504a. The computer 500 can read and write data from/to the recording medium 504a via the external I/F 504.

Examples of the recording medium 504a include a flexible disk, a Compact Disc (CD), a Digital Versatile Disk (DVD), a Secure Digital memory card (SD memory card), and a Universal Serial Bus (USB) memory card.

The communication I/F 505 is an interface for communicating with other apparatuses. Note that, the first packet transfer apparatus 20 and the second packet transfer apparatus 30 have a plurality of communication I/Fs 505.

The auxiliary storage apparatus 506 is, for example, a Hard Disk Drive (HDD), a Solid State Drive (SSD), or the like, and is a non-volatile storage apparatus that stores programs and data. Examples of the programs and data stored in the auxiliary storage apparatus 506 include, for example, an OS and application programs that achieve various functions on the OS.

The load monitoring apparatus 10, the first packet transfer apparatus 20, the second packet transfer apparatus 30, and the application determination apparatus 50 according to the embodiment of the present invention can execute various kinds of processing described above by using one or more computers 500 illustrated in FIG. 12. Each functional unit included in the load monitoring apparatus 10 is achieved by processing obtained by the CPU 501 or the like executing one or more programs stored in the auxiliary storage apparatus 506. For example, each of the functions included in the first packet transfer apparatus 20 is achieved by processing obtained by the CPU 501 or the like executing one or more programs stored in the auxiliary storage apparatus 506, the communication I/F 505, or the like.

Note that, the load monitoring apparatus 10 may have at least one of a display apparatus such as a display or an input apparatus such as a keyboard or a mouse, for example.

The present invention is not limited to the above-described embodiment specifically disclosed, and various modifications and changes can be made without departing from the scope of the claims. For example, although it has been described in the above-described embodiment that the packet transfer apparatus that performs the load balancing is the first packet transfer apparatus 20 and the packet transfer apparatus as the load balancing target is the second packet transfer apparatus 30, the present embodiment does not mean that a certain packet transfer apparatus always functions as any of the first packet transfer apparatus 20 or the second packet transfer apparatus 30. For example, the identical packet transfer apparatus may function as the first packet transfer apparatus 20, and may also function as the second packet transfer apparatus 30.

REFERENCE SIGNS LIST

1 Load balancing system
10 Load monitoring apparatus
20 First packet transfer apparatus
30 Second packet transfer apparatus
40 Application information database
50 Application determination apparatus
51 Application information search unit
101 Flow monitoring unit
102 Load balancing decision unit
103 Command transmission unit
201 Command reception unit
202 Path table changing unit
203 Input port
204 Flow information acquisition unit
205 Application determination unit
206 Path decision unit
207 Routing unit
208 Output port
209 Input buffer
N1, N2 Network

The invention claimed is:

1. A load balancing system, comprising:
an application information storage configured to store information obtained by associating application information including flow characteristics of an application of a flow constituted by a packet with a flow identifier for identifying the flow of the packet;
an acquisition unit, implemented using one or more computing devices, configured to acquire, based on an input port receiving a packet, application information of a flow constituted by the packet from the application information storage; and
an output unit, implemented using one or more computing devices, configured to output the packet received by the input port to a packet transfer apparatus in a load state indicating that a load due to the flow of the flow characteristics is determined to be less than a predetermined threshold among a plurality of packet transfer apparatuses according to the flow characteristics included in the application information acquired by the acquisition unit.

2. The load balancing system according to claim 1,
wherein the application information includes a type of the application,
wherein the load balancing system further includes a cache configured to store, based on an entry being replaced, a part of the information stored in the application information storage in a plurality of areas divided on the basis of priorities,
wherein the priorities indicate an order in which the entry is deleted from the cache based on the cache being filled and the entry being replaced,
wherein the acquisition unit is configured to acquire the application information from the cache, and
wherein, based on the application information not being acquirable from the cache, the acquisition unit is configured to (i) acquire, from the application information storage, the application information and (ii) register the application information in association with the flow identifier in an area of the plurality of areas on the basis of the type.

3. The load balancing system according to claim 2,
wherein the plurality of areas include a first area in which the entry is not deleted, a third area in which the entry is deleted, and a second area in which the entry is less likely to be deleted than the third area, and
wherein the acquisition unit is configured to (i) register, based on the type indicating that the application is to be preferentially cached, the application information in the second area and (ii) register, based on the type indicating that the application is not to be preferentially cached, the application information in the third area.

4. The load balancing system according to claim 3,
wherein the acquisition unit is configured to, based on the type indicating that the application is to be preferentially cached, select the entry to be replaced among entries in the second area or the third area by using a value obtained by multiplying an elapsed time after the entry is registered in the cache by a weighting factor, the weighting factor being a positive number less than 1, for the entry in the second area based on the entry of the cache being replaced on the basis of Least Recently Used (LRU).

5. The load balancing system according to claim 4,
wherein the first area is a manual registration area having a high priority, the second area is an LRU area having a low priority, and the third area is an automatic registration area having a medium priority.

6. The load balancing system according to claim 5, wherein the manual registration area is an area in which an entry is registered by a user.

7. The load balancing system according to claim 1, further comprising:
an application determination unit, implemented using one or more computing devices, configured to search the application information in the application information storage based on the flow identifier.

8. A load balancing method comprising:
storing, by an application information storage of a load balancing system, information obtained by associating application information including flow characteristics of an application of a flow constituted by a packet with a flow identifier for identifying the flow of the packet;
acquiring, by the load balancing system, based on an input port receiving a packet, application information of a flow constituted by the packet from the application information storage; and
outputting, by the load balancing system, the packet received by the input port to a packet transfer apparatus in a load state indicating that a load due to the flow of the flow characteristics is determined to be less than a predetermined threshold among a plurality of packet transfer apparatuses according to the flow characteristics included in the acquired application information.

9. The load balancing method according to claim 8,
wherein the application information includes a type of the application,
wherein the method further comprises:
storing, based on an entry being replaced, a part of the information stored in the application information storage in a cache having a plurality of areas divided on the basis of priorities,
wherein the priorities indicate an order in which the entry is deleted from the cache based on the cache being filled and the entry being replaced,
wherein acquiring the application information includes acquiring the application information from the cache, and
based on the application information not being acquirable from the cache, (i) acquiring, from the application information storage, the application information and (ii) registering the application information in association with the flow identifier in an area of the plurality of areas on the basis of the type.

10. The load balancing method according to claim 9,
wherein the plurality of areas include a first area in which the entry is not deleted, a third area in which the entry is deleted, and a second area in which the entry is less likely to be deleted than the third area, and
wherein the method further comprises (i) based on the type indicating that the application is to be preferentially cached, registering the application information in the second area and (ii) based on the type indicating that the application is not to be preferentially cached, registering the application information in the third area.

11. The load balancing method according to claim 10, further comprising:
based on the type indicating that the application is to be preferentially cached, selecting the entry to be replaced among entries in the second area or the third area by using a value obtained by multiplying an elapsed time after the entry is registered in the cache by a weighting factor, the weighting factor being a positive number less than 1, for the entry in the second area based on the entry of the cache being replaced on the basis of Least Recently Used (LRU).

12. The load balancing method according to claim 11, wherein the first area is a manual registration area having a high priority, the second area is an LRU area having a low priority, and the third area is an automatic registration area having a medium priority.

13. The load balancing method according to claim 12, wherein the manual registration area is an area in which an entry is registered by a user.

14. The load balancing method according to claim 8, further comprising:
   searching the application information in the application information storage based on the flow identifier.

* * * * *